Oct. 22, 1968 J. W. BUTCHER ET AL 3,407,063

HOT-PRESSING OF METAL POWDERS HAVING INERT SOLID SURFACE FILMS BY ADDING ACTIVATOR ELEMENTS

Filed June 8, 1967 6 Sheets-Sheet 5

United States Patent Office 3,407,063

Patented Oct. 22, 1968

3,407,063

HOT-PRESSING OF METAL POWDERS HAVING INERT SOLID SURFACE FILMS BY ADDING ACTIVATOR ELEMENTS

John William Butcher, Newbury, England, and Robert Lionel Samuel, Geneva, Switzerland, assignors to United Kingdom Atomic Energy Authority, London, England Continuation-in-part of applications Ser. No. 400,652, Oct. 1, 1964, and Ser. No. 447,960, Apr. 14, 1965. This application June 8, 1967, Ser. No. 644,671

Claims priority, application Great Britain, Oct. 7, 1963, 39,502/63; Apr. 17, 1964, 16,102/64; June 20, 1966, 27,539/66

32 Claims. (Cl. 75—226)

ABSTRACT OF THE DISCLOSURE

Some metal powders normally have surface films of compounds (e.g., oxides) which inhibit the production of high-density sintered compacts. This inhibiting effect is counteracted by hot-pressing such powders after application thereto of a small quantity of an element which promotes diffusion of the metal through the layer during the hot-pressing.

Cross-references to related applications

This application is a continuation-in-part of application Ser. No. 400,652, filed Oct. 1, 1964, by John W. Butcher, and of application Ser. No. 447,960, filed Apr. 14, 1965, by John W. Butcher and Robert L. Samuel. Application Ser. No. 539,859, filed Apr. 4, 1966 by John W. Butcher, and of common assignee, is also related.

Background of the invention

This invention relates to compaction processes in which particles of a metallic powder are sintered under pressure at elevated temperature to form a solid body of high density.

The adhesion of the powder particles, which occurs as the first stage in the sintering process, can be inhibited by oxide films, grease films and other foreign matter, e.g., nitride films and carbide films which are so common a feature of metal powders.

These oxide, nitride or carbide film forming materials normally have a higher sintering temperature than has the metal and as a consequence they interfere seriously with the compaction and adhesion processes. If the films are only thin they can sometimes be punctured or partially eliminated by relative mechanical movement of the particles, as for example, under hot pressing conditions. Certain metal powders, however, are very resistant to such sintering processes, and they sinter only with difficulty.

In the past, attempts have been made to reduce the adverse influence of the film either by removing it completely by chemical action, or by contacting the surface layer with a relatively large quantity of a material which forms a liquid eutectic at the temperatures used in the subsequent compaction processes.

Such processes suffer from various defects. It is not possible to remove the film completely at an economic rate. The formation of a liquid eutectic is undesirable since the metal particles may become cemented together by the eutectic phase and not bonded together by metal-metal bonds. The removal is normally only possible if the film can be converted into gaseous products, and gases are usually quite harmful if they carry through to the compaction process, producing porosity and undesirable chemical side effects.

It has now been found that the compaction of metal powders which have relatively inert surface films preventing adhesion can be improved by the use of certain additives which activate the film and promote diffusion of metal therethrough. This improvement can be regarded as having its prime effect on the adhesion of the particles.

In the application of this invention to the sintering of powders it is to be understood that the powder is in itself a sinter powder, that is, it has a particle size and distribution suitable for the sintering process. The preparation of sinter powder from various metals per se is known in the powder metallurgy art. Attention is, however, drawn to "Treatise on Powder Metallurgy," Claus G. Goetzel, Interscience Publishers Inc., New York, 1949, especially volume 1, which describes the principles and practise of the preparation of sinter powder and sintering processes, and attention is drawn also to U.K. Patent 840,857 and to U.S. Patent 3,115,408 which describe sintering processes for beryllium.

Summary of the invention

This invention comprises a process for hot-pressing metal powder particles, said particles having on their surfaces an inert solid film comprising at least one of the group consisting of the oxide, nitride and carbide of said metal which constitutes an unwanted barrier to the formation of metal-to-metal bonds between the particles of the metal, which process comprises producing a valency imbalance in said solid film by applying to said particles an activator element having a stable valency different from that of the metal and an interatomic distance not greater than permits atoms of said element to displace atoms of said metal in the lattice of the film, the quantity of said element being sufficient to promote diffusion of said metal through said film at the sintering temperature of the metal powder but insufficient to form a distinct phase with said metal in said film, and hot-pressing the particles to sinter them together.

The invention allows lower sintering temperatures to be used. In the case of beryllium, for example, a temperature in the range 750–950° C. can be used and this inhibits grain growth during the sintering stage. This feature is the subject of the aforementioned application Ser. No. 539,859. The imbalance can be achieved by incorporating into the lattice an activator material having a stable valency different from that of the metal in the lattice forming the surface film. The activator may be distributed as a very fine powder or as a vapour, and it may be produced in situ by decomposition of a suitable compound. For example, metal carbonyls may be formed and decomposed in situ.

In order for the added material to become incorporated in the surface film it must have a favourable atomic size in relation to the atomic size of any element which it displaces in the film. The upper limit for the atomic size of the added element is about 115% of the atomic size of the metal. In the case of beryllium powder, with beryllium being displaced in the film, for example the atomic size of beryllium is 2.44 Angstroms and the upper limit for the atomic size of the added element would therefore be about 2.8 Angstroms.

The required quantity of the said element is very small. It must be present in the surface layer to have its effect during sintering, and therefore the surface area of the surface layer plays a part in determining the quantities to be used. A larger surface requires a larger quantity of added element.

Upper and lower limits are, in practice difficult to specify because it is difficult to ascertain the surface area of a metal powder. It is, however, a matter of simple experiment to estimate the surface area of a powder when its history is known and this allows calculation of the quantity of element to be added to carry out the process of the invention. A simple experimental sintering trial will then establish if activation has occurred.

When excess of the added material is used it has an alloying action. Localised distortion of the entities as is required to form strong metal-metal bonds is thereby prevented and sintering is consequently not significantly improved.

It has been found that 0.016 atomic percent based on the total material is a suitable proportion for the added element with respect to beryllium.

The upper limit will depend on the type of compound present as surface layer and on the nature of the said element but will normally be not greater than 0.03 atomic percent for an appreciable effect. The small value of the upper limit is significant in comparison with the alloying additions which are made normally to improve sintering, these being about 6 to 8 wt. percent.

Many of the elements which are to be specified herein as added elements for beryllium are common elements in the metallurgical art, and they may have been incorporated as alloying addition in beryllium in the past. For example, iron is known to be common impurity in beryllium, but it has no beneficial influence on the bonding of beryllium entities if it is incorporated as an impurity in the beryllium lattice, or is present in too great a quantity in contact with the surface layer on the beryllium.

Elements suitable for use on beryllium power include:

| Element: | Valency |
|---|---|
| B | 3 |
| C | 4 |
| Si | 4 |
| Cr | 2, 3, 6 |
| V | 2, 4, 5 |
| Re | 4, 7 |
| Fe | 2, 3 |
| Co | 2, 3 |
| Ni | 2, 3 |
| Ru | 3, 4, 6, 8 |
| Rh | 3, 4 |
| W | 6 |
| Mo | 3, 5, 6 |
| Mn | 2, 3, 4, 6, 7 |
| Pd | 2, 4 |
| Os | 4, 6, 8 |
| Ir | 3, 4, 6 |
| Pt | 2, 4 |

Carbon has been identified in the past as an undesirable element for beryllium sintering processes but this is clearly due to the formation of beryllium carbide as a distinct phase.

It is preferable to maintain the atmosphere pressure below 20 micron Hg pressure during sintering, at any rate it should be kept below 70 microns Hg.

Description of preferred embodiments

Figure 1:
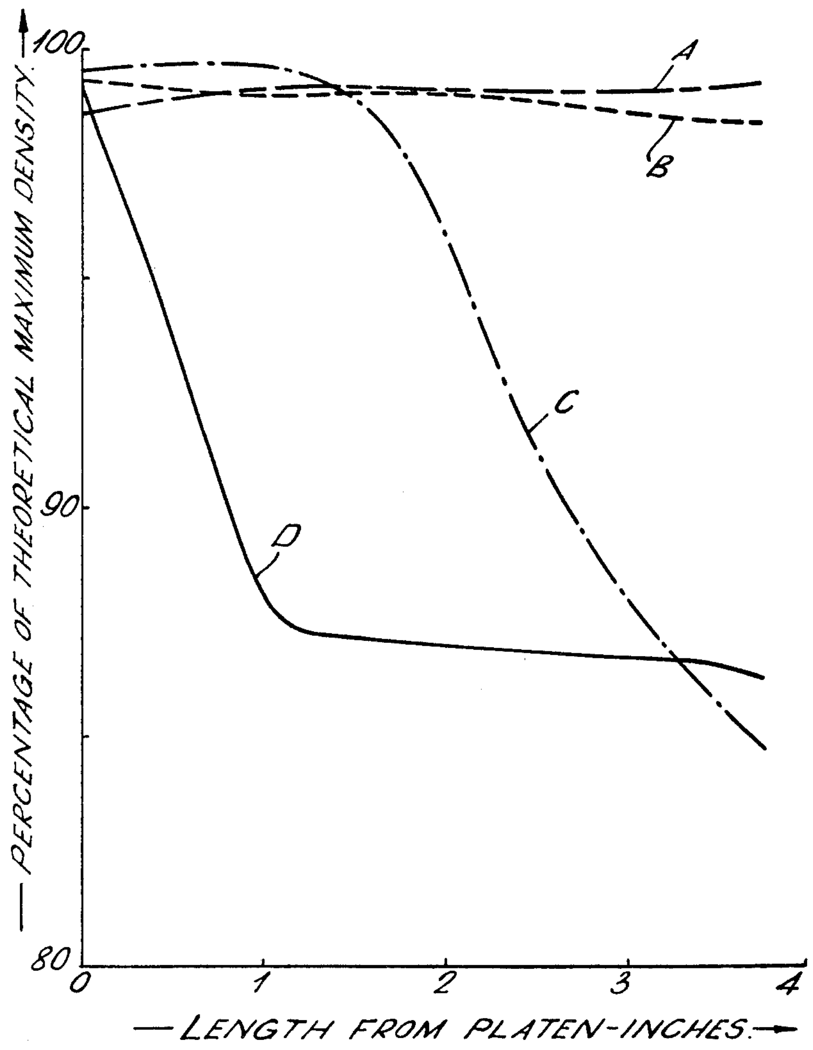
FIGURE 1 is a graph showing the variation of density along the axis of a beryllium compact produced by hot-pressing unactivated beryllium powder feedstocks, as described in Example 13.

The following examples illustrate the invention with respect to the sintering of beryllium powder.

The powder was prepared by producing a casting and producing swarf therefrom, powdering the swarf under argon atmosphere in a planetary ball mill employing beryllium lined pots and tungsten carbide balls. After milling for 20 minutes the powder was sieved to yield batches of −200 mesh B.S. The batches were collected and divided into identical aliquots of weight 370 gms.

The chemical analysis of the powdering is given in the Table below:

| Element: | Quantity, p.p.m. by weight |
|---|---|
| Mg | <15 |
| Al | 240 |
| Fe | 300 |
| Si | 40 |
| Mn | <5 |
| Cr | 30 |
| Ni | <5 |
| Cu | 65 |
| C | 360 |
| O | 4200 |
| Be | Balance |

The elements to be added were spectroscopically pure and were sieved to a particle size of −400 mesh B.S.

Example 1.—Boron 0.07 gm. of boron powder were added to 370 gms. of beryllium powder prepared as described above, and the mixture was milled for 20 minutes in the above described ball mill.

The milled mixture was vibrated into a cylindrical graphite mould 4 inches long and 2 inches in diameter. After outgassing at 550° C. to less than 20 microns Hg pressure the powder was heated to 1100° C. while maintaining the vacuum, the heating rate being such that the temperature rose from 550° C. to 1100° C. in 3 hours. It was held at 1100° C. for one hour and was then mechanically pressed by a plunger at a pressure of 1 ton per square inch for one hour.

The charge was allowed to cool and was hammered out of the mould and machined to 1.8 inches diameter to remove carbon contamination.

The density of the sintered compact was found to be 102.5% of the theoretical maximum density (1.845 gm./cc.) of beryllium metal at the end adjacent the plunger, and fell smoothly to 100% at the end away from the plunger.

In contrast with this, sintering of one of the aliquots of beryllium powder using the procedure described above, but omitting the addition step, produced a sintered cylinder whose density was 98% of the theoretical maximum adjacent the plunger and fell sharply below 98% 1.6 inches from this end, reaching 80% at a distance of 2.4 inches, thereafter falling off to a density of 60%.

Example 2.—Vanadium 0.34 gm. of vanadium powder were added to 370 gms. of beryllium powder using the milling procedure described in Example 1, and the mixture was sintered by the procedure also described in Example 1. The density of the sintered compact was 100% of the theoretical maximum at the end adjacent the plunger and fell slowly to 98% at the far end.

Example 3.—Chromium 0.35 gm. of chromium powder were added to 370 gms. of beryllium powder using the milling procedure described in Example 1 and the mixture was sintered by the procedure described in Example 1. The density of the sintered compact was 98% along its entire length.

Example 4.—Iron 0.37 gm. of iron powder were added to 370 gms. of beryllium powder as in Example 1 and the mixture was sintered as in Example 1 above. The density of the sintered compact was 99% of the theoretical maximum along its entire length.

Example 5.—Cobalt 0.39 gm. of cobalt powder were mixed with 370 gms. of beryllium powder as in Example 1 and the mixture was sintered as in Example 1. The density of the sintered compact was 98% of the theoretical maximum along its entire length.

Example 6.—Nickel 0.39 gm. of nickel powder were mixed with 370 gms. of beryllium powder by the procedure as in Example 1 and the mixture was sintered by the procedure as in Example 1. The density of the sintered compact was 100% of the theoretical maximum along its entire length.

Example 7.—Molybdenum 0.63 gm. of molybdenum were added to 370 gms. of beryllium powder by the procedure described in Example 1 and the mixture sintered as in Example 1. The density of the sintered compact was 98% of the theoretical maximum along its entire length.

Example 8.—Ruthenium 0.67 gm. of ruthenium powder were mixed with 370 gms. of beryllium powder as in Example 1 and the mixture was sintered by the procedure of Example 1. The density of the sintered compact was slightly above 100% of the theoretical maximum at the end adjacent the plunger and fell to slightly below 100% at the far end.

Example 9.—Rhodium 0.68 gm. of rhodium powder were mixed with 370 gms. of beryllium powder as in Example 1 and the mixture was sintered by the procedure of Example 1. The sintered compact had a density of 98% of the theoretical maximum along its entire length.

Example 10.—Tungsten 1.21 gms, of tungsten powder were mixed with 370 gms. of beryllium powder by the procedure of Example 1 above and the mixture was sintered by the procedure of Example 1. The density of the sintered compact was 101% of the theoretical maximum at the end adjacent the plunger and fell to 100.5% at the far end.

Example 11.—Platinum 1.21 gms. of platinum powder were added to 370 gms. of beryllium as in Example 1 and the mixture sintered by the procedure of Example 1. The density of the sintered compact was 100% of the theoretical maximum at the end adjacent the plunger and fell to 98% at the far end.

Example 12.—Manganese 0.36 gm. of manganese were added to 370 gms. of beryllium as in Example 1 above, and the mixture sintered by the procedure as in Example 1. The density of the sintered compact was 99% of the theoretical maximum at the end adjacent the plunger and remained at this figure for a 2 inch length, thereafter it fell smoothly to 93% at the far end.

Example 13.—Silicon

Silicon is a common impurity in beryllium powder, but silicon present as an impurity does not influence the surface layer of oxide etc., and therefore does not affect the compacibility of the powder. As will be seen later (FIGURE 1), a beryllium feedstock with 200 p.p.m. silicon as impurity had good compactibility whereas another beryllium feedstock obtained from a different source but having a similar analysis and containing 210 p.p.m. of silicon as impurity had poor compactibility.

The silicon may be obtained in vapor form in situ during the process by chemical reaction. Thus for example in one case a graphite mould was coated with ethyl silicate which was dried and baked to form a glazed finish on the graphite. During the bonding of beryllium powder at 20 micron Hg pressure and under an applied mechanical pressure of 1 ton/sq. in. at 1100° C. the silicate underwent chemical changes and silicon was liberated by reduction of silicon oxide by beryllium.

In another case the beryllium powder was mixed with 500 p.p.m. of finely divided silicon metal. The mixture was ball milled for thorough intermixture prior to hot pressing at 1100° C. and 1 ton/sq. in. pressure.

The quantity of silicon required is a function of the surface area of the powder and it is also conditioned by the method adopted for its distribution. The quantity required is clearly very small and is normally below 1000 p.p.m. based on the total weight of the beryllium and its associated surface layer. In exceptional circumstances where the powder has a very high surface area, the quantity required may be greater than 1000 p.p.m. Such exceptional circumstances occur when, for example, a powder is prepared by ball milling swarf obtained from a beryllium compact formed from powder of poor compactibility without use of the invention. In this case the grains forming the compact are still surrounded by unactivated surface layer.

During the ball-milling, transgranular cracking takes place at the poorly bonded surfaces of the original grains and as a consequence the powder has twice the surface area of the powder forming the original compact. In an example of such a case 1200 p.p.m. of silicon added as fine powder were used to promote diffusion through the layer.

The lower limit of the required quantity of silicon is about 200 p.p.m. with powders ball milled from cast material. If the silicon is added in the vapor phase, it may be possible to use less than 200 p.p.m. When, for example silicon was added as a constituent of trichlorosilane, this being a liquid at room temperature, very good activation was achieved. The qunatity of silicon in the trichlorosilane was 190 p.p.m. based on the total weight of beryllium powder and surface layer. 500–750 p.p.m. has been found to be most effective on powders obtained directly from cast materials.

The distribution of the silicon over the surface layer is aided by maintaining a low pressure over the material. A maximum pressure of 70 micron Hg is desirable, with a maximum of 20 micron Hg in preferred cases. Temperatures of 1000°–1200° C. can be used.

The use of silicon will now be discussed in more detail with reference to FIGURES 1–3. The curves in FIGURE 1 were obtained with the following four powders A, B, C and D which, respectively, were obtained commercially as Brush Q.M.V., Avonmouth, Brush Super Pure and Pechiney coarse powder. All these powders are obtained from milled cast beryllium. The table gives the impurity contents in parts per million (p.p.m.).

| | Mg | Al | Fe | Si | Mn | Cr | Ni | Cu | C | O | Average particle size (microns) |
|---|---|---|---|---|---|---|---|---|---|---|---|
| A | 65 | 800 | 1,100 | 450 | 20 | 45 | 60 | 70 | 500 | 6,500 | 9 |
| B | 40 | 470 | 800 | 200 | 20 | 40 | 10 | 60 | 280 | 2,500 | 11 |
| C | 120 | 370 | 540 | 210 | 30 | 35 | 5 | 65 | 370 | 4,400 | 28 |
| D | 10 | 120 | 310 | 40 | 5 | 10 | 5 | 35 | 300 | 3,000 | 100 |

These powders were subjected to the following standard process which was developed to indicate the compactibility properties of the powder. The standard process consisted of:

(a) Loading 370 gms. powder in a CS graphite mould 2" dia. under vibration in argon.

(b) Heating to 550° C. and outgassing for a half hour until the pressure was below 2 microns.
(c) Heating to 1100° C., holding this temperature for one hour and then pressing for one hour with ITSI, cooling under vacuum.

Curve A was obtained with powder A, curve B with powder B, curve C with powder C and curve D with powder D. It can be seen that powders A and B maintained a high density along the axis of the pressed rods whereas powders C and D did not. These curves indicate the compactibility without the application of silicon to the powders.

Figure 2:
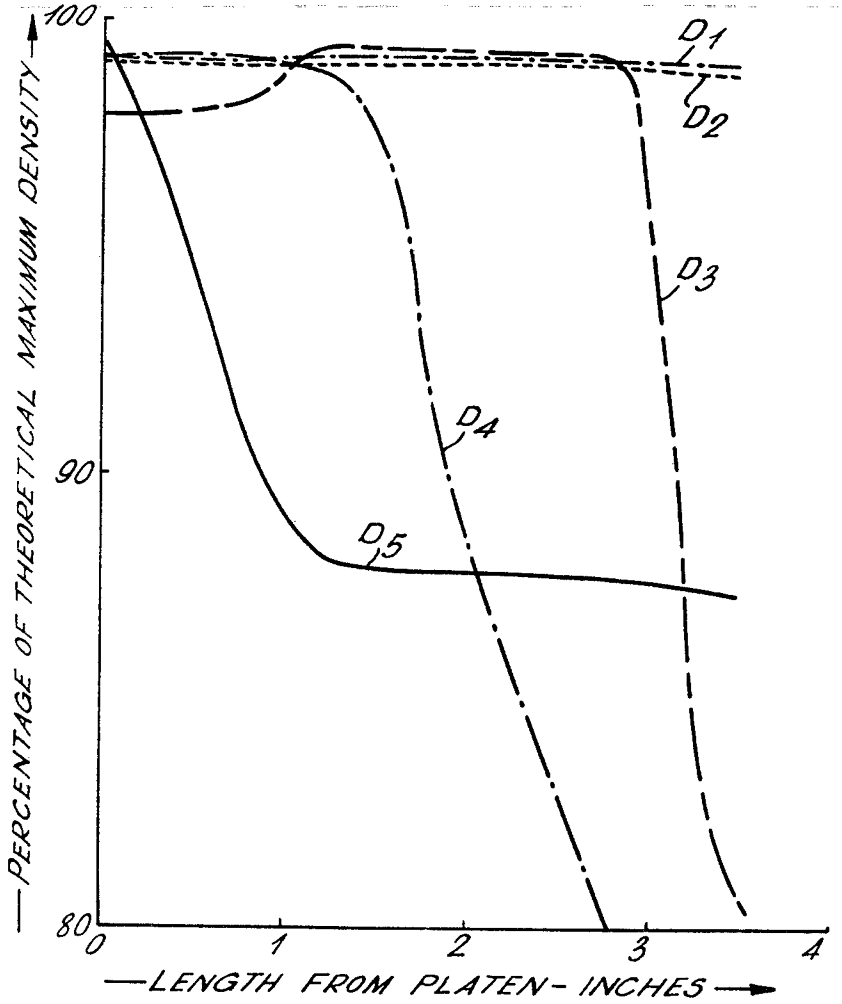
FIGURE 2 is a graph showing the effect of varying the quantity of silicon applied as an activator element to one feedstock of FIGURE 1 in Example 13.

In FIGURE 2, the curve $D_1$ to $D_5$ were obtained using powder D in accordance with the present invention. The powder was subjected to the following standard process:

(a) The charge was weighed and the appropriate quantity of silicon added as powder.
(b) The charge and addition was ball milled for 20 minutes in Be lined pots with WC balls (0.5" dia.) to intermix the Be and Si.

Curve $D_1$ was obtained when the quantity of added silicon was 750 p.p.m., curve $D_2$ when the quantity was 500 p.p.m., curve $D_3$ with 1000 p.p.m., curve $D_4$ with 250 p.p.m. nad curve $D_5$ with 0 p.p.m., that is, curve $D_5$ corresponds to curve D in FIGURE 1. It can be seen that the best improvement was obtained with 750 and 500 p.p.m. 1000 p.p.m. of silicon improved the compactibility but softened the beryllium somewhat to the extent that it extruded out of the base plug of the press.

Figure 3:
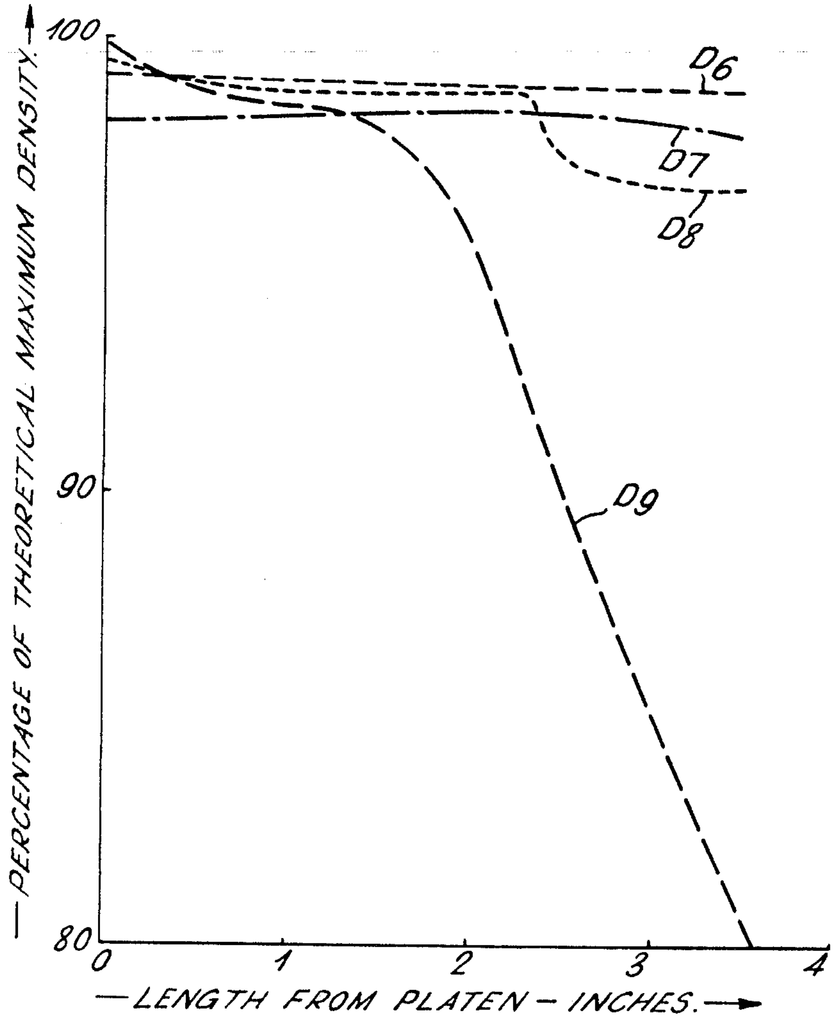
FIGURE 3 shows the effect of varying the degree of vacuum used in hot-pressing the feedstock of FIGURE 2 with silicon applied as the activator element in Example 13.

In FIGURE 3 the curves were obtained using powder D. Two batches of the powder were treated by the process described with respect to FIGURE 2, the pressure being less than 20 micron Hg for one batch and greater than 70 micron Hg for the other, and two more batches were treated by the following steps:

(1) Spray CS grade graphite with 90% ethyl silicate.
(2) Heat to 250° C. for 10 hours.
(3) Cool and charge with beryllium powder as usual.

When each treated batch was subjected to the hot pressing process described with reference to FIGURE 1 curves $D_6$ to $D_9$ were obtained. Curve $D_6$ was obtained with 500 p.p.m. of silicon contacted with the beryllium at less than 20 micron pressure, curve $D_7$ was obtained with ethyl silicate contacted at 20 micron pressure, curve $D_8$ was obtained with 500 p.p.m. of silicon contacted with the beryllium at greater than 70 micron pressure and curve $D_9$ was obtained with ethyl silicate contacted with the beryllium at greater than 70 micron pressure.

The following examples are illustrative of the invention with respect to the sintering of metal powders other than beryllium, using activators added as volatile decomposable compounds.

Example 14.—Chromium

To 1000 gm. samples of −200 mesh commercial quality chromium powder were added firstly 500 p.p.m. of silicon as commercial trichlorosilane ($SiHCl_3$), a liquid containing 60% by volume of $SiHCl_3$, and secondly 500 p.p.m. of molybdenum as molybdenum carbonyl crystals ($Mo(CO)_6$). These compounds were added to the powder in a polyethylene bottle and shaken vigorously. These compounds decompose readily below 200° C. to deposit a fine dispersion of silicon and molybdenum respectively on the chromium powder particles. The samples were hot pressed in a 2 inch diameter graphite die at 1100° C. for 2 hours under a pressure of 1 ton/sq. in. and a vacuum of better than 300 microns Hg. The graphite die and plunger were sheathed with tantalum foil to prevent carbon contamination of the metal by the graphite. The longitudinal variation in density was determined from slices taken from the resulting compact.

Figure 4:
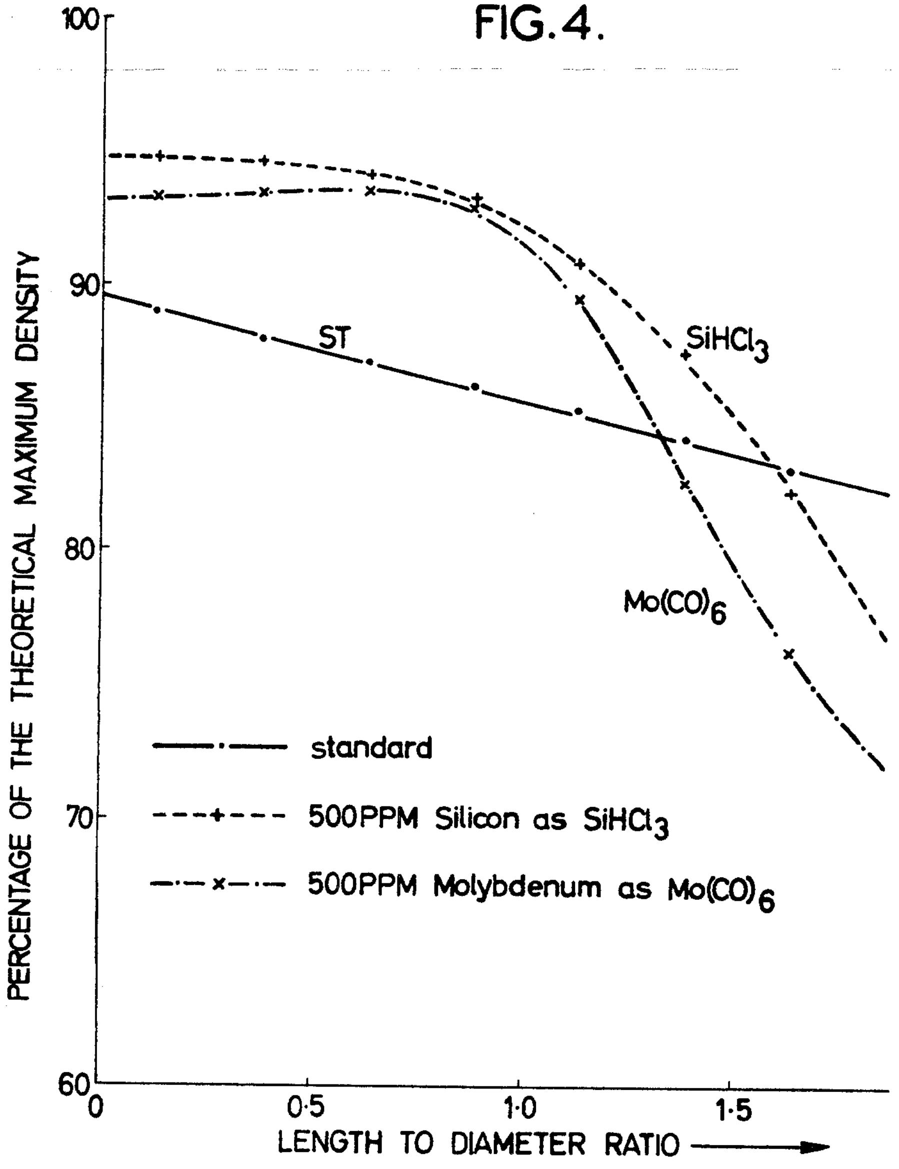
FIGURE 4 shows curves comparing the variation in density with distance from plunger in activated and unactivated hot-pressed chromium, as described in Example 14.

In FIGURE 4 this variation in density, taken as a percentage of the theoretical maximum (7.14 gm./cc.) is plotted against the distance of the slice from the end of the compact adjacent the plunger used to apply the pressure, divided by the compact diameter. It will be seen that the silicon and molybdenum activators both produce a substantial increase in density as compared with the standard (non-activated) powder.

Figure 5:
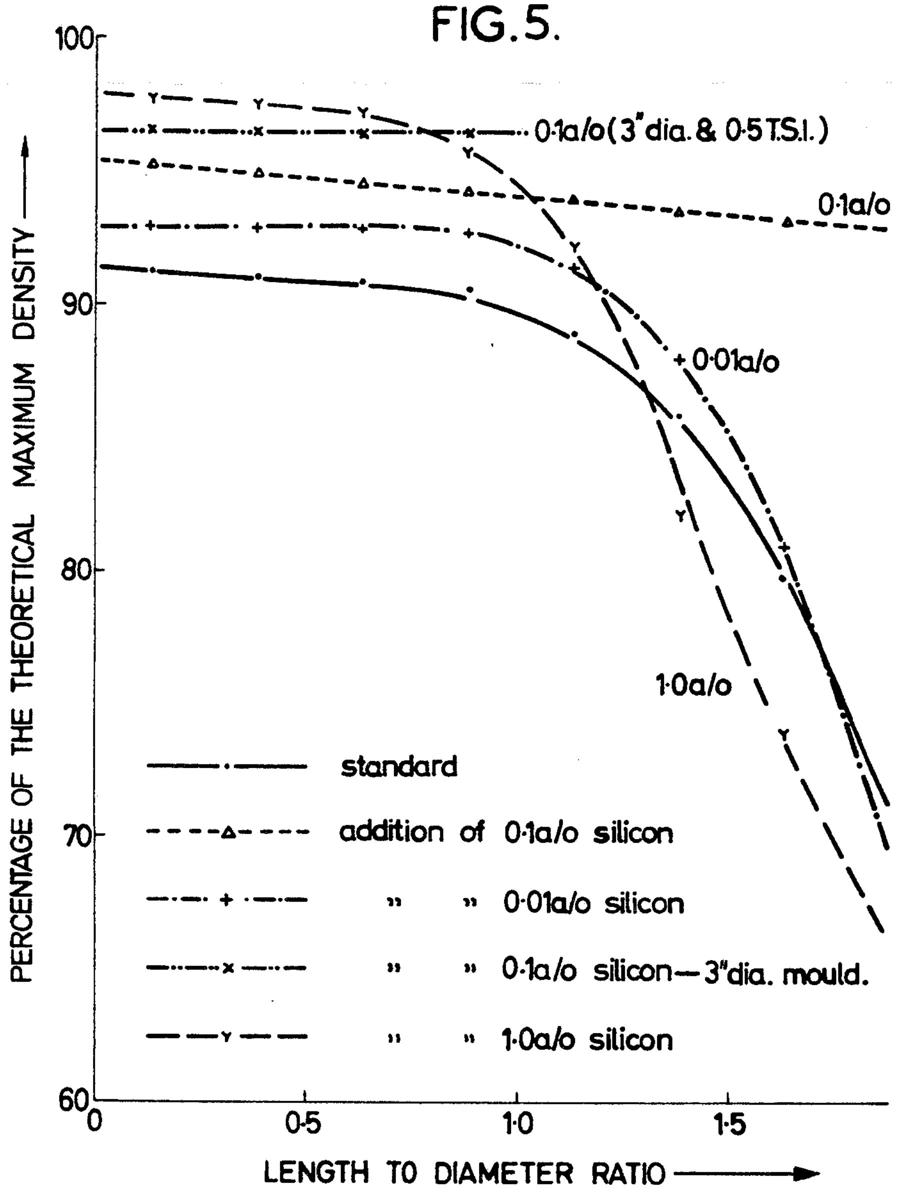
FIGURE 5 shows curves similar to FIGURE 4 comparing the effect of varying the quantity of activator in Example 14.

FIGURE 5 shows the effect of varying the quantity of trichlorosilane from zero (standard) to 1.0 atomic percent silicon. Compaction was carried out at 1180° C. for 2 hours in vacuo under 1.5 tons/sq. in. using a 2 inch diameter graphite mould. It will be seen that about 95% of full density was achieved with an optimum of 0.1 atomic percent of silicon (corresponding to 540 p.p.m. of silicon) and that this value was maintained when the pressure was reduced to 0.5 tons/sq. in. with a die diameter of 3 inches.

In addition to increasing the density, the machine-ability of the compact was greatly improved by activation with the volatile silane.

Example 15.—Niobium

To a 500 gm. sample of −200 mesh niobium powder was added 500 p.p.m. silicon as trichlorosilane and the mixture hot pressed at 1200° C. under 2 tons/sq. in. in a tantalum-lined 2 inch diameter graphite mould. The overall density of the resulting compact was 92.1% of the theoretical density (8.57 gm./cc.), as compared with 87.5% when powder not activated with silicon was used.

Example 16.—Tungsten

Figure 6:
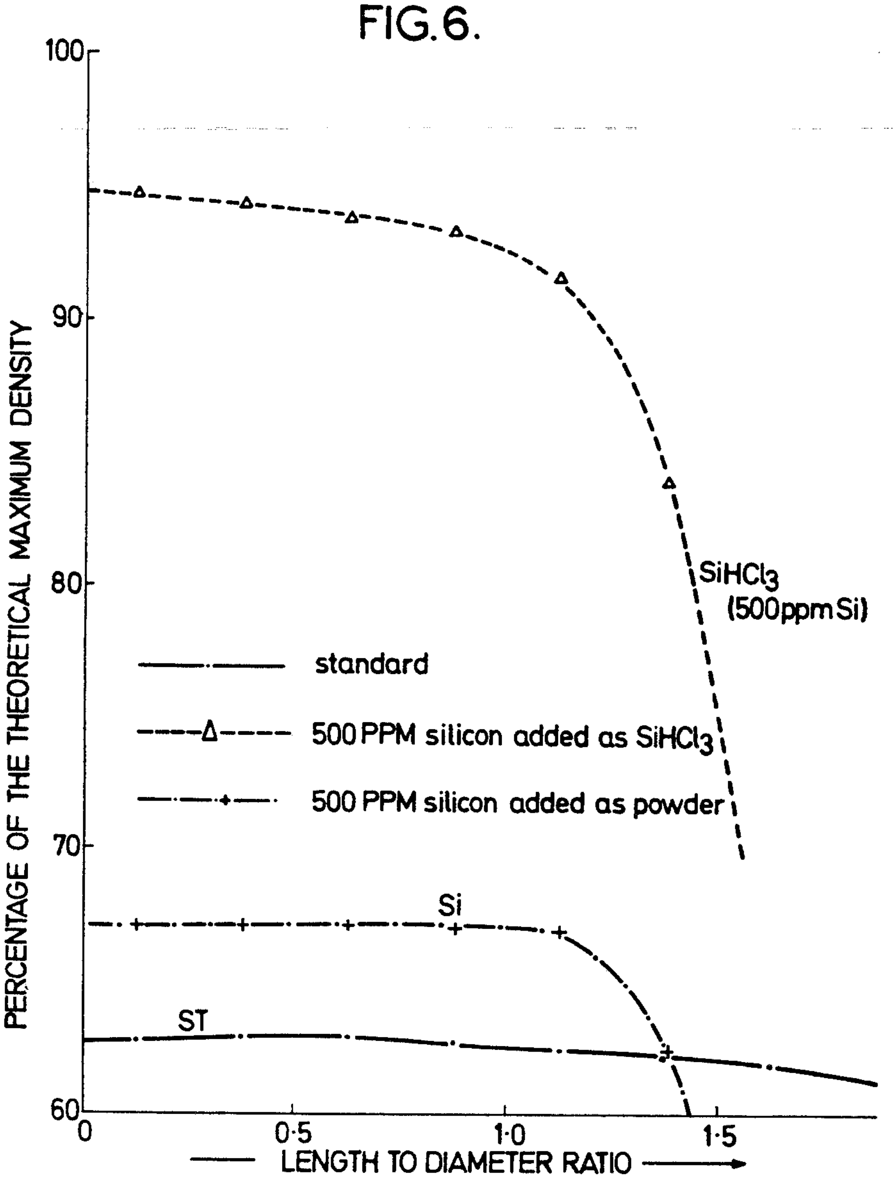
FIGURE 6 shows curves similar to FIGURE 4 comparing the density of activated and unactivated hot-pressed tungsten, as described in Example 16.

To a 2000 gm. sample of −200 mesh commercial quality tungsten powder was added 500 p.p.m. silicon as trichlorosilane and the constituents intermixed in a polyethylene container. Hot pressing was performed at 1180° C. and a pressure of 1.5 tons/sq. in. in vacuo for 2 hours in a 2 inch diameter tantalum-sheathed graphite die. FIGURE 6 shows the variation of density, expressed in the same manner as FIGURES 4 and 5, the theoretical maximum density being 19.3 gm./cc. It will be seen that a density of about 95% was achieved, as compared with less than 70% with the standard (non-activated) powder and with powder activated with 500 p.p.m. of silicon as the powdered element.

Example 17.—Iron

To 1000 gm. samples of two varieties of iron powder, Swedish Sponge and British Electrolytic, of −200 mesh, were added 500 p.p.m. of silicon as trichlorosilane and hexamethyldisiloxane, mixed by shaking. The samples were hot pressed in vacuo in 2 inch diameter copper-sheathed graphite moulds at 800° C. under 1 ton/sq. in. pressure. The following table shows the densities obtained as percentage of the theoretical maximum of 7.87 gm./cc.

| Powder: | Overall density of 4 inch long billet percent |
|---|---|
| Sponge standard (nonactivated) | 80.5 |
| Electrolytic standard (non-activated) | 84.1 |
| Sponge with trichlorosilane | 77.8 |
| Electrolytic with trichlorosilane | 75.0 |
| Sponge with hexamethyldisiloxane | 91.2 |
| Electrolytic with hexamethyldisiloxane | 94.3 |

Although the addition of hexamethyldisiloxane produced a substantial increase in density, trichlorosilane had the opposite effect. This appears to be due to a chemical reaction between the iron and trichlorosilane involving hydrochloric acid formation; the resulting compact rusted on exposure to air. As hexamethyldisiloxane is a hydrocarbon, its use results in the inclusion of some carbon in the compact; the machining properties of such compacts are similar to mild steel.

The above examples relate only to pure metal powders, but the process is also applicable to powders whose particles largely consist of one or more of these metals, e.g. stainless steel powders, as the following example shows.

Example 17.—Stainless steel

To 500 gm. samples of stainless steel of composition B.S. 316L were added 1000 p.p.m. of silicon as trichlorosilane, mixed by shaking. Samples were hot pressed in vacuo in 2 inch diameter tantalum-sheathed graphite moulds at 900° C. and 1100° C. under 2 tons/sq. in. pressure. The following table shows the densities obtained in absolute units and as percentages of the maximum theoretical density of 7.92 gm./cc.

| Sample and temperature: | Overall density of approx. 2 inch long billet |
| --- | --- |
| 900° C. standard (non-activated) | 6.62 gm./cc. (83.6%) |
| 1100° C. standard (non-activated) | 7.80 gm./cc. (98.7%) |
| 900° C. (Si-activated) | 6.91 gm./cc. (87.5%) |
| 1100° C. (Si-activated) | 7.88 gm./cc. (99.6%) |

It will be seen that activation resulted in an increase in density, producing almost total densification at 1100° C.

We claim:

1. A process for hot-pressing metal powder particles, said particles having on their surfaces an inert solid fi.m comprising at least one of the group consisting of the oxide, nitride and carbide of said metal which constitutes an unwanted barrier to the formation of metal-to-metal bonds between the particles of the metal, which process comprises producing a valency imbalance in said solid film by applying to said particles an activator element having a stable valency different from that of the metal and an interatomic distance not greater than permits atoms of said element to displace atoms of said metal in the lattice of the film, the quantity of said element being sufficient to promote diffusion of said metal through said film at the sintering temperature of the metal powder but insufficient to form a distinct phase with said metal in said film, and hot-pressing the particles to sinter them together.

2. A process as claimed in claim 1 in which the metal is beryllium and the activator element has an interatomic distance not greater than 2.8 Angstroms and a stable valency different from that of beryllium.

3. A process according to claim 1 wherein said metal is beryllium and said activator element is selected from the group consisting of boron, carbon, chromium, vanadium, rhenium, iron, cobalt, nickel, ruthenium, rhodium, tungsten molybdenum, manganese, palladium, osmium, iridium, platinum and silicon.

4. A process as claimed in claim 1 in which the interatomic distance of said activator element does not exceed 115% of the interatomic distance of said metal.

5. A process as claimed in claim 1 in which the activator element is a fine powder.

6. A process as claimed in claim 5 in which the activator element is a powder of particle size of up to mesh size 400 B.S.

7. A process as claimed in claim 1 in which the metal is beryllium and the activator element quantity does not exceed 0.03 atomic percent based on the total quantity of beryllium.

8. A process as claimed in claim 1 wherein said metal is beryllium obtained from a casting and has a low halogen content.

9. A process as claimed in claim 1 which comprises forming an intimate mixture of a metal sinter powder, said powder having a surface film of inert material which constitutes a barrier to the adhesion of the said sinter powder in a sintering process, and an activator material, said activator material being in powder form and having a particle size less than that of the said metal sinter powder and said activator material having a stable valency different from that of the said metal and an interatomic distance up to 115% of the interatomic distance of the said metal, and the quantity of said activator material being less than that which forms a distinct phase in the said surface film and being sufficient to promote the diffusion of metal through the said film, and sintering the said intimate mixture under an applied pressure upwards of 0.1 ton/sq. in. and under a vacuum not greater than 70 microns Hg pressure.

10. A process as claimed in claim 9 in which the said vacuum is not greater than 20 microns Hg pressure.

11. A process as claimed in claim 1 wherein the activator element is applied by contacting said particles with a volatile compound of said element, said compound being decomposable by heat to liberate said element at said surface film.

12. A process as claimed in claim 1 wherein the metal powder is selected from the group consisting of chromium, niobium, tungsten, iron, and an iron alloy.

13. A process as claimed in claim 12 wherein the metal powder is chromium and the activator element is selected from the group consisting of silicon and molybdenum.

14. A process as claimed in claim 12 wherein the metal powder is niobium and the activator element is silicon.

15. A process as claimed in claim 12 wherein the metal powder is tungsten and the activator element is silicon.

16. A process as claimed in claim 12 wherein the metal powder is iron and the activator element is silicon.

17. A process as claimed in claim 12 wherein the metal powder is stainless steel and the activator element is silicon.

18. A process as claimed in claim 11 wherein the activator element is silicon and the volatile compound is selected from the group consisting of trichlorosilane and hexamethyldisiloxane.

19. A process as claimed in claim 11 wherein the activator element is molybdenum and the volatile compound is molybdenum carbonyl.

20. A process as claimed in claim 1 for hot-pressing high purity beryllium powder particles derived from cast beryllium into a high-density compact, said particles having an inert non-metallic surface layer comprising at least one of the group consisting of beryllium oxide, beryllium nitride and beryllium carbide which constitutes an unwanted barrier to the formation of beryllium-beryllium metal bonds between the particles, which process comprises producing a valency imbalance in said surface layer by applying silicon to the powder particles in an amount of from 190 to 1200 p.p.m. based on the total weight of beryllium and surface layer to promote diffusion through said layer, said amount being below that which forms an individual compound or eutectic phase with the beryllium, and hot-pressing the powder particles to sinter them together and form said compact.

21. A process as claimed in claim 20 wherein the quantity of silicon is not greater than 1000 p.p.m. based on the total weight of beryllium and surface layer.

22. A process as claimed in claim 21 wherein the quantity of silicon is not less than 200 p.p.m. based on the total weight of beryllium and surface layer.

23. A process as claimed in claim 20 wherein said silicon is applied by contacting said particles with a silicon compound in vapour form, said silicon compound being decomposable by heat to liberate silicon at said surface layer.

24. A process as claimed in claim 23 wherein in said silicon compound is a silicon oxide.

25. A process as claimed in claim 23 wherein said silicon compound is trichlorosilane.

26. A process as claimed in claim 20 wherein the hot pressing is performed in a vacuum of less than 70 micron Hg.

27. A process as claimed in claim 20 wherein the hot pressing is performed in a vacuum of less than 20 micron Hg.

28. A process as claimed in claim 20 wherein the cast beryllium contains very little chlorine.

29. A process as claimed in claim 20 wherein said beryllium contains less than 200 p.p.m. aluminium and wherein the compact has a length to diameter ratio of at least unity.

30. A process as claimed in claim 20 wherein the compact has a length which is larger than its diameter and in which the density along the length thereof is substantially uniform.

31. A process as claimed in claim 1 wherein after applying said activator element to said particles, said particles are maintained at a sintering temperature for a prolonged period prior to hot pressing.

32. A process as claimed in claim 20 wherein after applying silicon to the powder particles, said particles are maintained at a sintering temperature for a prolonged period prior to hot pressing.

References Cited

UNITED STATES PATENTS

| | | | |
|---|---|---|---|
| 3,337,336 | 8/1967 | Rao | 75—200 X |
| 3,359,098 | 12/1967 | Teaford | 75—208 |

FOREIGN PATENTS

| | | |
|---|---|---|
| 1,289,662 | 2/1962 | France. |
| 840,857 | 7/1960 | Great Britain. |

OTHER REFERENCES

"The Metallurgy of Beryllium," Inst. of Metal Monograph and Report Series No. 28, Chapman & Hall, Ltd., October 1961, pp. 708,709 and 720–723.

AEC Document, KAPL, AECD–2679, Aug. 18, 1949, pp. 12, 14, 17–19 and 21–23.

Journal of the Less-Common Metals, 12 (1967), pp. 353–365.

CARL D. QUARFORTH, *Primary Examiner.*

R. L. GRUDZIECKI, *Assistant Examiner.*